April 15, 1958 E. E. JONES 2,830,475
ELECTRO-FLUID CONTROL SYSTEM FOR POWER TOOLS
Filed Jan. 6, 1956 6 Sheets-Sheet 1

INVENTOR
EVERETT E. JONES
BY
HIS ATTORNEYS

April 15, 1958 E. E. JONES 2,830,475
ELECTRO-FLUID CONTROL SYSTEM FOR POWER TOOLS
Filed Jan. 6, 1956 6 Sheets-Sheet 2

INVENTOR
EVERETT E. JONES
BY
HIS ATTORNEYS

April 15, 1958     E. E. JONES     2,830,475
ELECTRO-FLUID CONTROL SYSTEM FOR POWER TOOLS
Filed Jan. 6, 1956     6 Sheets-Sheet 3

INVENTOR
EVERETT E. JONES
BY
HIS ATTORNEYS

April 15, 1958    E. E. JONES    2,830,475
ELECTRO-FLUID CONTROL SYSTEM FOR POWER TOOLS
Filed Jan. 6, 1956    6 Sheets-Sheet 4

INVENTOR
EVERETT E. JONES
BY
Campbell, Brumbaugh, Free & Graves
HIS ATTORNEYS

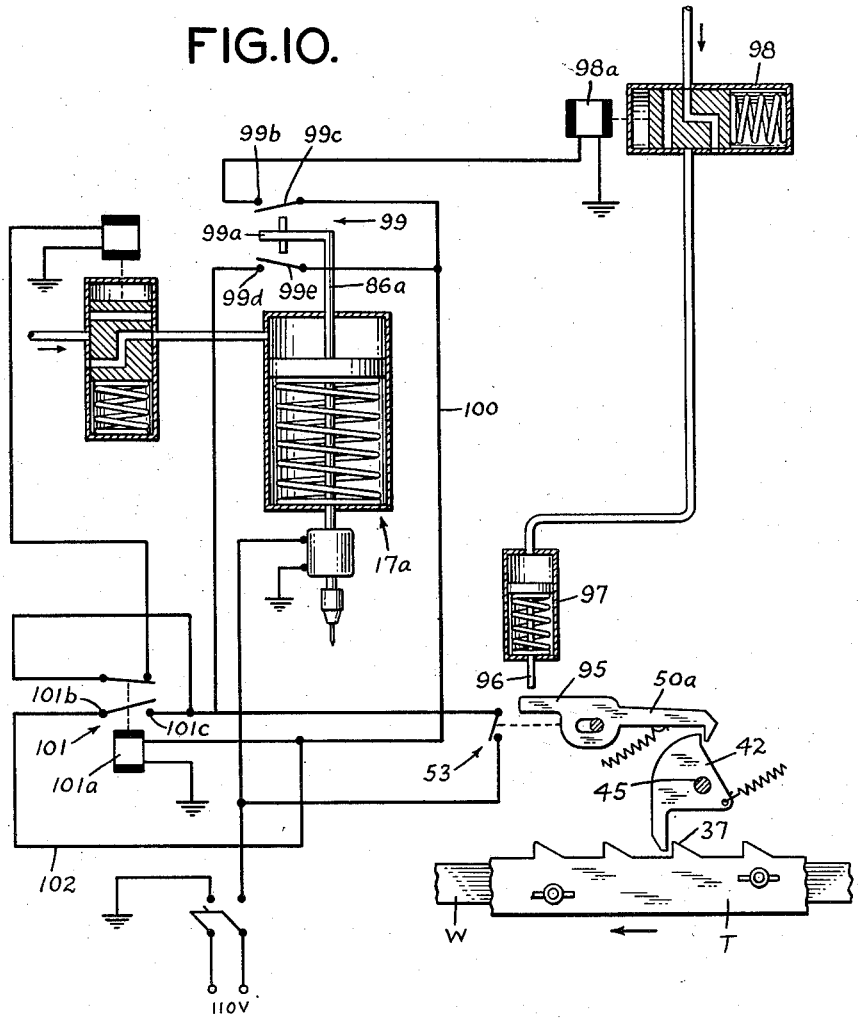

United States Patent Office 2,830,475
Patented Apr. 15, 1958

2,830,475

ELECTRO-FLUID CONTROL SYSTEM FOR POWER TOOLS

Everett E. Jones, Hagerstown, Md., assignor to Fairchild Engine and Airplane Corporation, Hagerstown, Md., a corporation of Maryland Application January 6, 1956, Serial No. 557,763

6 Claims. (Cl. 77—32.2)

This application relates to control systems for power tools such as drills, punch presses and the like by means of which a series of operations can be conducted automatically or semi-automatically.

In the production of metal parts, for example, the skins, ribs, spars of the aircraft, it frequently is necessary to drill or punch a series of holes in the parts to receive rivets by means of which the parts are connected. In some instances, holes have been drilled in the metal parts by mounting them in jigs or fixtures and drilling groups of holes with multiple drill apparatus. The cost of multiple tool set-ups and the jigs and fixtures for handling the article to be drilled, punched or otherwise formed or machined is so great that many industries cannot afford to use them. In addition, the set up and manufacturing time of these fixtures frequently offsets a high percentage of economic gain.

In the aircraft and consumer products industry it is necessary to change the design of the product frequently. Under present methods employing fixed center to center spacing of work heads and fixtures, the advantageous respacing of holes frequently is not put into effect, due to the cost and time consumed for manufacture or modification of these work heads and fixtures.

When automatic machinery is not used, the holes usually are formed by means of manually handled power drills which in themselves are relatively inexpensive but involve high labor costs and low production rates.

In accordance with the present invention, I have provided a simplified form of control system that may be used for controlling the operation of a drill, a punch press, milling machine, shaper, saw or other tool for operating on, shaping or otherwise modifying metallic articles or the like in which the operation of the tool is under the control of a simple, inexpensive and easily made templet. More particularly, the control system involves elements which cooperate with the templet to cause an operation of a tool to take place upon contact of an element of the control system with control surfaces such as a series of teeth on the templet. Each tooth of the templet produces an operation of the power tool and the spacing of the teeth is such as to control the spacing between operations on the article undergoing treatment. Thus, for example, if a series of holes are to be drilled in a wing spar or the like, a templet having a series of teeth in properly spaced relation is secured to the wing spar and the wing spar and the apparatus are moved relatively by the use of the spar. Each tooth on the templet causes an operation of the power tool and is responsive in turn to the completion of an operation to permit further advance of the templet and the wing spar to enable another operation thereon. The system is provided with interlocking controls which allows the drilling operations or the like to take place very quickly and being dependent primarily upon the rapidity with which the drill can actually drill a hole in the article undergoing treatment. In the case of a high speed drill working on sheet metal, the holes may be drilled at very high rates, for example, as high as 360 holes per minute. With a punch press, even higher operating speeds can be obtained so that with a minimum cost for templets and the like, high speed drilling operations and the like can be accomplished without the exercise of any skill on the part of the operator.

For a better understanding of the present invention, reference may be had to the accompanying drawings in which:

Figure 10 is a schematic illustration of still another form of the apparatus.

Figures 1, 8:
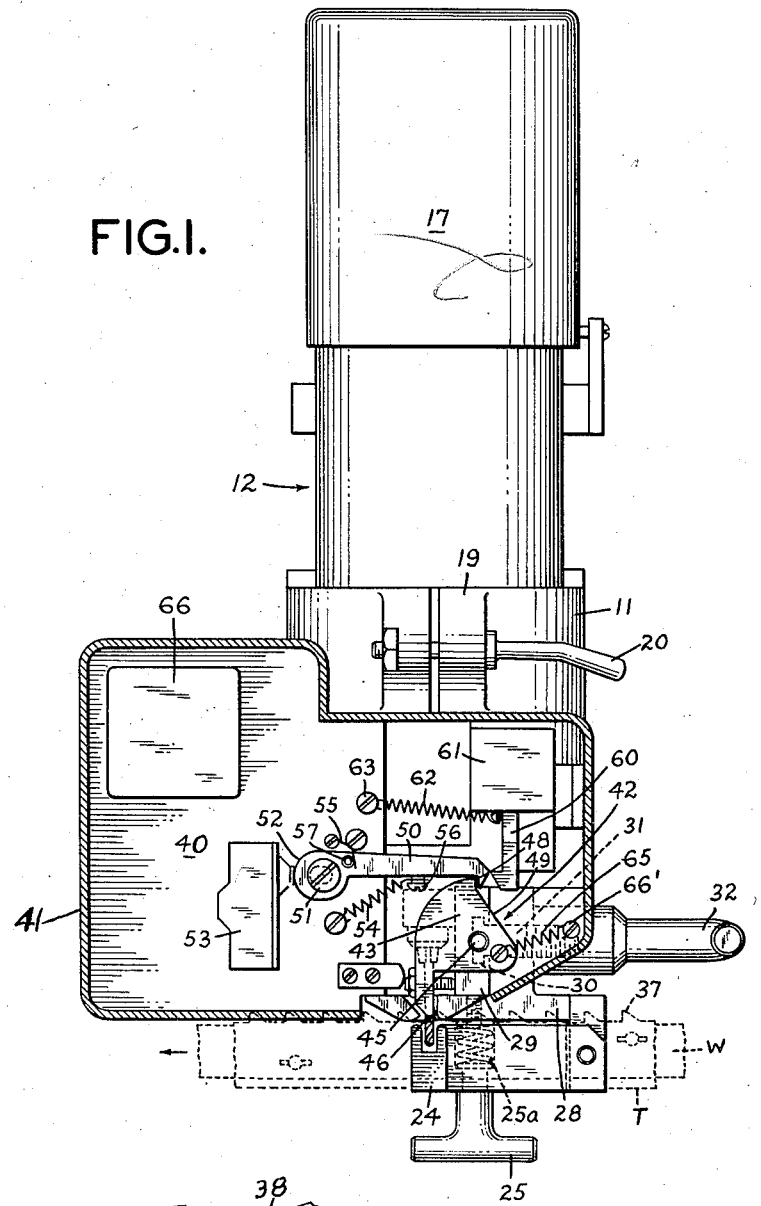
Figure 1 is a plan view of a typical apparatus embodying the present invention with portions of the casing of the apparatus broken away to illustrate details of construction.
Figure 8 is a perspective view of a typical form of templet for controlling the operation of the drilling machine for forming holes in an element.

As will be explained in greater detail hereinafter, the control system embodying the present invention may be utilized for controlling the operation of a great many different kinds of tools such as drills, punch presses, milling machines, shapers and the like. Inasmuch as this invention relates specifically to an accurate spacing control device, irrespective of the type of work performed, it can be used in many applications of automation, as for example, inserting rivets or assembling other parts in holes or spaces irregularly or evenly spaced as dictated by the design of the templet.

Figures 1 to 7 illustrate a typical embodiment of the control system as applied to an automatically operated drill for sequentially drilling holes in a structural element such as, for example, a wing spar, a nose piece for a wing, a flat wing sheet or other metal, plastic or similar article. As illustrated in the drawings, a typical automatic drilling apparatus may be provided with a base plate 10 which may be supported on a frame, pillar, work bench or the like and is provided with an upright member 11 on which is mounted a powered drilling device 12. The drilling device 12 may be, for example, a commercially available type and includes an electric motor M mounted within a housing 13 and provided with a drive shaft 14 on which is mounted a chuck 15 for supporting a twist drill 16 or the like. The motor is mounted for sliding movement in the casing 13 and is moved axially thereof by means of an air cylinder 17 and piston P. The automatic drilling device 12 described above is illustrated schematically in Figures 4 to 7.

As will be explained in greater detail hereinafter, the air cylinder is used to advance the motor M, chuck 15 and drill 16 to drill a hole while the spring S retracts them from contact with the work.

Figure 3:
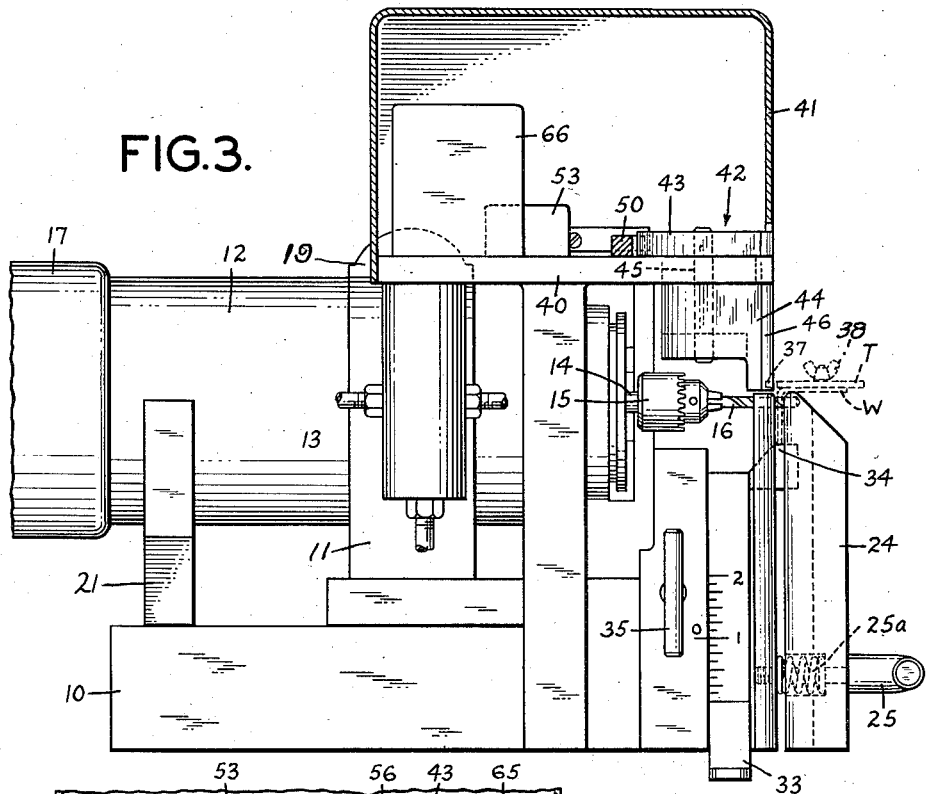
Figure 3 is a side elevational view of the device with parts broken away and parts shown in section.

As shown in Figures 1 and 3, the drilling device 12 is mounted in a split collar 19 at the upper side of the upright member 11 by means of which the drilling device can be adjusted lengthwise or withdrawn for servicing or repair. The split collar 19 is provided with a clamping screw 20 by means of which the drilling device is clamped in position. A separate supporting bracket 21 may be mounted on the base 10 to support the rear end of the drilling device 12 as best shown in Figure 3.

Figure 2:
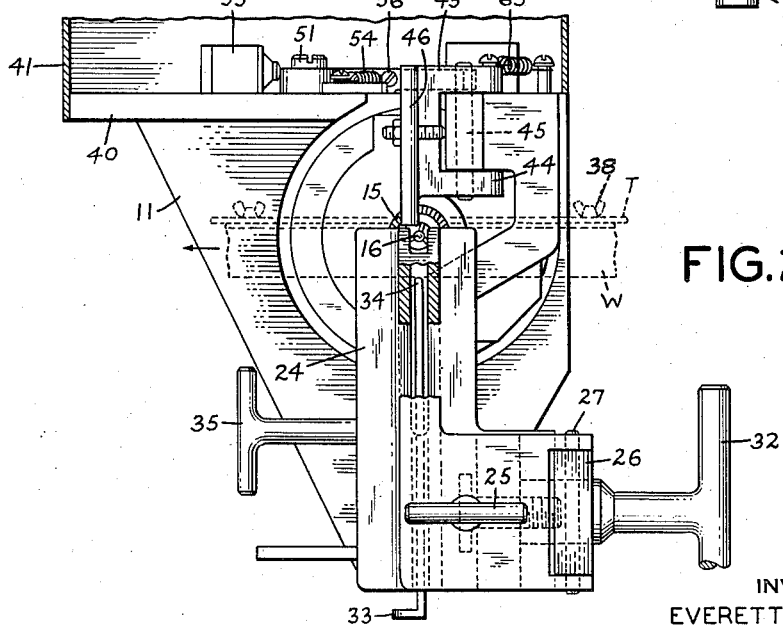
Figure 2 is a front elevational and partially sectional view of the device of Figure 1.

The drilling device 12 cooperates with a workpiece W and a templet T to drill a series of holes in the workpiece. The workpiece W is guided in front of the drill 12 by means of suitably adjustable guideways. As illustrated in Figure 3, the base plate 10 carries a jaw 24 at its right hand end, the jaw being adjustable by means of a T-headed hand screw 25 to receive slidably a flange or other element on the workpiece W. Figure 2 shows that the jaw 24 is supported on a hinge barrel 26 by means of a hinge pin 27 in order to allow the jaw to be swung open or to close as may be required. The hinge barrel 26, as shown in Figure 1 is mounted on a generally T-shaped plate 28 which is mounted on the side of an upright 29, extending from the upper surface of the base plate 10. A spring 25a is disposed around the screw between the jaw 24 and the plate 28 to normally urge them apart. An undercut slot 30 in the upright 29 receives a headed screw 31 which in turn is engaged by a nut 32 having a T-shaped hand grip on it to allow the member 28 to be clamped tightly against the upright. Inasmuch as the undercut groove extends vertically, the member 28 and the clamping jaw 24 can be moved vertically to accommodate different sizes of articles and moreover, to locate the article in a plane perpendicular to the drill.

Another guide is also provided for guiding the workpiece W in proper relation to the drill. As shown in Figure 3, a slide member 33 is mounted on one side of the upright and has a nose 34 thereon which engages the lower edge of the workpiece W. The slide 33 may be adjusted up and down by means of a hand manipulated nut and bolt 35 similar to the nut and bolt 31, 32 described above. A gauge may be mounted on the slide in order to indicate the precise location of the workpiece relative to the drill 16. The above described adjustments enable the workpiece to be located properly with respect to the axis of the twist drill 16 so that a series of holes can be drilled in the workpiece.

Control of the drill is obtained by means of the templet T, one form of which is shown in Figure 8. A typical templet T may consist of a strip or sheet of metal having any desired configuration corresponding generally to the configuration of the workpiece to be operated upon. The templet can be formed of relatively thin gauge sheet metal, plastic or the like and it is provided with a series of teeth 37 along its edge corresponding in spacing to the holes H to be drilled in the workpiece W. The templet is secured to the workpiece in any suitable way, as for example, by means of bolts and wing nuts 38 passing through the templet and the workpiece or by clamps or clips or any other mechanism for securing these elements firmly together.

The system for advancing and retracting the drill 16 will now be described. Mounted above the drilling device 12 and the guides for the workpiece and templet is a platform 40 provided with a suitable cover 41. The operating mechanism for the control system includes a control member 42 having a sector-shaped portion 43 disposed above the platform and a generally similarly shaped extension 44 connected thereto disposed below the platform 40. The control member and extension are mounted on a pivot pin 45 on the platform 40. As best shown in Figure 3, the extension 44 has an elongated substantially vertical edge portion 46 which is in the path of the teeth on the templet T so that movement of the templet to the left as viewed in Figure 4 will engage the edge 46 and tend to rotate the upper sector-shaped member 43 in a clockwise direction about the pivot pin 45.

A nose or locking surface 48 is formed at the inner side of the sector-shaped member 43 and this nose surface merges into an outwardly inclined edge 49. Engaging with the nose surface 48 is a hook member 50 which is mounted for sliding and pivoting movement on a supporting screw 51 mounted on the platform 40. The inner end of the hook member 50 is provided with a curved surface 52 which cooperates with the button of a limit switch 53. The hook member is normally biased clockwise and toward the switch by means of a coil spring 54 and a leaf spring 55 which are mounted on the platform 40 and are joined to or bear against screws or lugs 56 and 57, respectively, on the hook 50. When the hook is urged by the springs to its retracted position to the left, the switch 53 is open, but the switch 53 is closed when a tooth 37 is pressed against the edge 46 of the control member thereby rocking it slightly clockwise and pulling the hook member 50 bodily to the right against the action of the springs 54 and 55.

A second hook member 60 is connected to the drill unit 12 and moves bodily with the motor and the chuck 15. The hook 60 is supported pivotally on a supporting block 61 which is fixed to the motor housing, the hook 60 being biased in a clockwise direction by means of a tension spring 62 connected to it and to a fixed screw 63 on the platform 40. It will be evident, that as the motor and chuck 15 advance, the hook 60 will be moved from the position shown in Figure 1 in which the end of the hook 50 is engaged, into engagement with the inclined surface 49 in front of the hook end of the hook member 50. Upon retraction of the motor and the drill chuck 15, the hook 60 will engage and lift the hook 50 out of contact with the nose surface 48 thereby allowing the sector-shaped member 43 to be rocked farther in a clockwise direction to enable the tooth 37 in contact with it to pass by the edge 46. After the tooth passes, the sector-shaped member is rotated counterclockwise by means of a spring 65 which is connected to it eccentric to the pivot pin 45 and to a screw or lug 66' on the platform 40.

Mounted within the housing 41 is also a control switch and relay 66, the function of which will be described in connection with a typical operation of the system as illustrated in Figures 4 to 7 inclusive.

At the beginning of a drilling operation, the motor M and the piston P are retracted in the cylinder 17 by any suitable biasing means, such as, air pressure, liquid pressure or the spring S. The hook member 50 is retracted by the spring or springs 54, 55 on its sliding pivot connection 51 so that the switch 53 is in an open condition. Also, the hook 60 will be retracted with the motor and the chuck 15 so that it engages the outer end of the hook member 50.

The motor M for driving the drill is connected in a suitable electric circuit including a double pole single throw switch 70 connected to the terminals of a power source and when closed connecting one terminal of the power source to ground and the other to a conductor 71 and to one terminal of the motor, the other terminal of the motor being grounded. The conductor 71 is also connected to one terminal 53a of the switch having its other moving contact 53b connected by means of a conductor 72 to relay contacts 73a and 73b of the relay 66. The relay 66 also has two movable contacts 73c and 73d, the contact 73c being engaged with the contact 73a when the relay is deenergized while the contacts 73b and 73d are open. When the coil 73e of the relay 66 is energized, the contacts 73a, 73c are open and the contacts 73b and 73d are engaged.

The contact 73c is connected to a line 74 which is joined to one terminal of the coil or winding 76a of a solenoid controlled slide valve 76. The other terminal of the coil 76a is connected to ground.

A line 75 connects the contact 73d to one terminal of a switch 77 which is normally open, the other terminal of the switch being connected by means of a line 78 to the contact 53b. One end of the coil 73e of the relay 66 is connected to the line 75 the other end of the coil being grounded.

Figure 4:
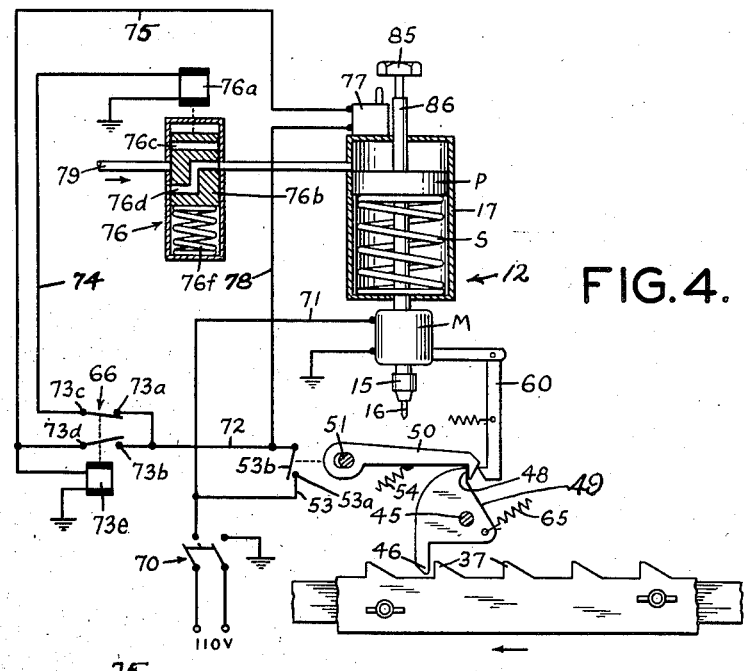
Figure 4 is a schematic diagrammatic illustration of the electrical circuit and control elements of the apparatus as applied to an electrically driven drill with the elements in starting position for the drilling of a hole in an article.
Figure 5:
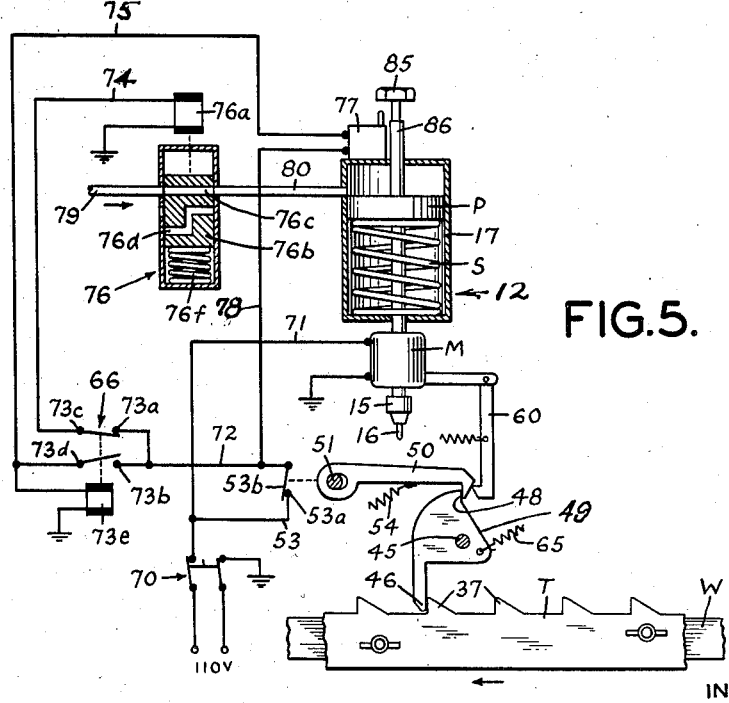
Figure 5 is a similar schematic illustration, illustrating the positions assumed by the element at the beginning of a drilling operation.

As shown in Figure 4, the air valve 76 includes a slide 76b having two passages therethrough one being a straight through passage 76c and the other one a zig-zag or offset passage 76d. The housing or casing 76e is provided with connections for an air pressure line 79 and a connection 80 to the air cylinder 17 above the piston P. With the parts in the position shown in Figure 4 to which they are normally biased by the spring 76f, the cylinder is vented to atmosphere so that the piston P and the motor M are fully retracted.

Figure 6:
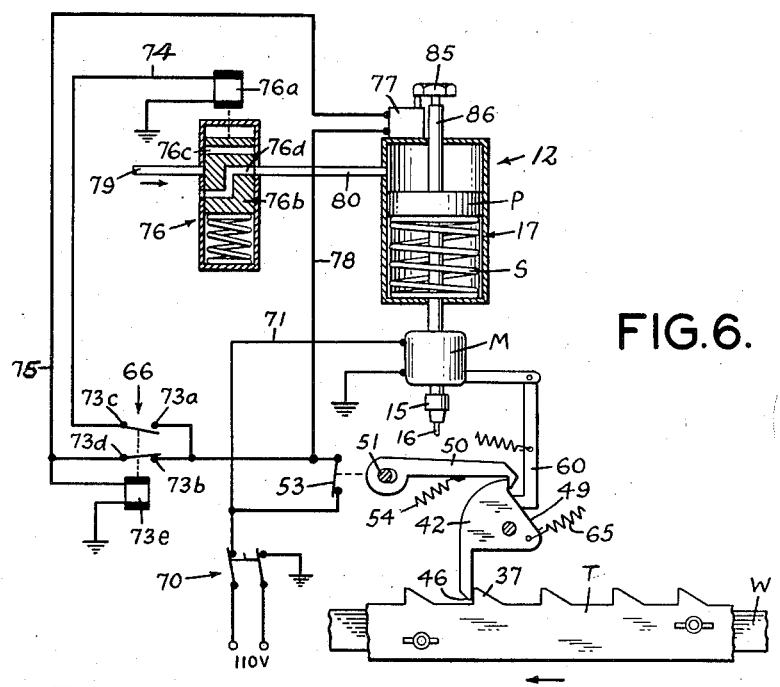
Figure 6 is a schematic illustration of the apparatus at the completion of the drilling operation.
Figure 7:
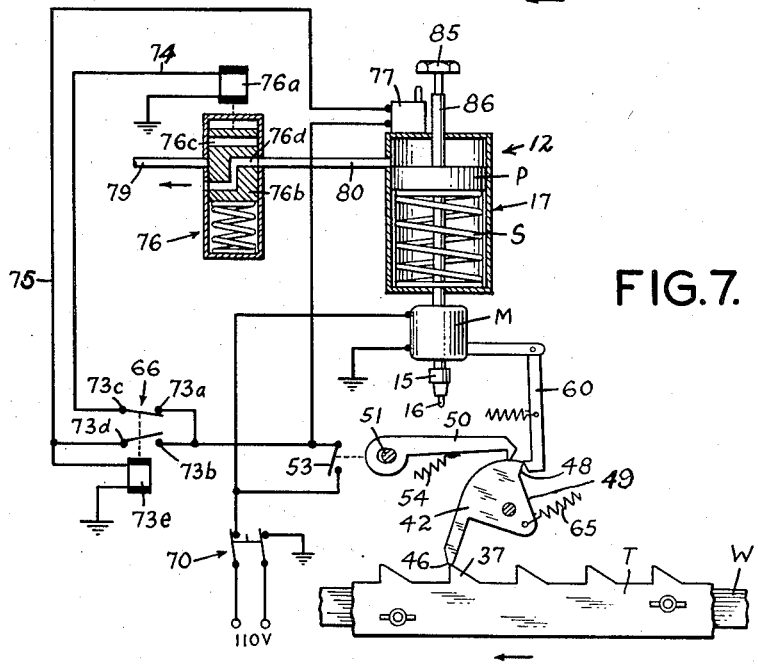
Figure 7 is a schematic illustration of the position of the articles during the movement of the templet and the article to a new position for drilling another hole in the article.

When the switch 70 is closed, an electrical circuit is completed through the switch, the line 71 and the ground connection through the motor M, setting the motor into operation. As the workpiece with the templet T secured thereto is moved to the left in the direction of the arrow shown in Figure 4, a tooth 37 will engage the edge 46 of the control member 42 and will move it to the position shown in Figure 5. In this condition, the hook member 50 is displaced to the right allowing the contacts 53a and 53b of the switch 53 to close thereby completing a circuit through one blade of the switch 70, conductor 71, switch 53, relay contacts 73a, 73c, conductor 74, through the slide valve coil 76a to ground, thereby energizing the coil and causing it to displace the slide 76 downwardly to bring the passage 76c into alignment with the air lines 79 and 80 and supplying air to the cylinder 17 behind the piston P. The air then forces the piston P outwardly, advancing the motor M and the chuck 15 and twist drill 16 to drill a hole in the workpiece W and also moving the hook 60 down onto the inclined surface 49 of the sector-member 43 below the outer end of the hook member 50 (Fig. 6). When the piston P is advanced to the limit of its forward travel the enlarged head 85 on the end of the piston rod 86 which is secured to the piston P closes the normally open switch 77 thereby completing a circuit from the switch 70 through the switch 53, conductor 78, switch 77, conductor 75, relay coil 73c to ground and thereby energizing the relay 66 and shifting its movable contacts to the position shown in Figure 6. The relay contacts 73a, 73c then are disengaged while the relay contacts 73d, 73b are engaged creating a holding circuit through the relay coil 73e as follows: Conductor 71, switch 53, relay contacts 73b, 73d, relay winding 73e to ground. Inasmuch as the contacts 73a, 73c are now open, the circuit through the coil 76a of the air valve 76 is open and the spring returns the slide to its original position so that air is vented from the cylinder 17 to atmosphere and the spring S returns the piston, motor M, chuck 15 and twist drill 16 to their retracted position as shown in Figure 7 and opens switch 77. During the return movement of the motor M, the hook 60 engages beneath the nose of the hook 50 and lifts it off the surface 48 thereby allowing the spring 54 to retract the hook member 50 and open the switch 53, thereby deenergizing the relay coil 73e and allowing the contacts to assume the original positions shown in Figure 4. Also, rocking movement of the hook member 50 disengages it from the surface 48 thereby freeing the control member 42 for further movement in a clockwise direction and allowing the tooth 37 in contact with it to move past the edge 46. Rocking movement of the member 42 disengages the hook 60 from the hook member 50, as shown in Fig. 7. As soon as the tooth 37 passes the edge, the spring 65 snaps the control member in a counterclockwise direction allowing the hook 50 to again hook over the nose of the control member and engage the surface 48 thereby reestablishing the entire control system for a further operation by engagement of the next tooth 37 of the templet T with the control member 42.

The device can be operated with extreme rapidity, especially when dealing with thin sheet metal members such as the parts used in airplane construction or other consumer products so that the holes can be formed at the rate of almost six a second by merely pushing the workpiece or the templet attached thereto through the machine. In a punching operation, equally high or higher speeds can be achieved.

The use of an air cylinder has the advantage that the drilling or other forming operation can proceed as fast as may be required or desirable since it applies a uniform pressure which allows the drill to feed through the workpiece at optimum rate. Retraction of the drill is rapid and there can, of course, be no binding of the drill since the hook 50 in engagement with control member 42 prevents advance of the workpiece until the drill has been retracted completely from contact with the workpiece.

Figure 9:
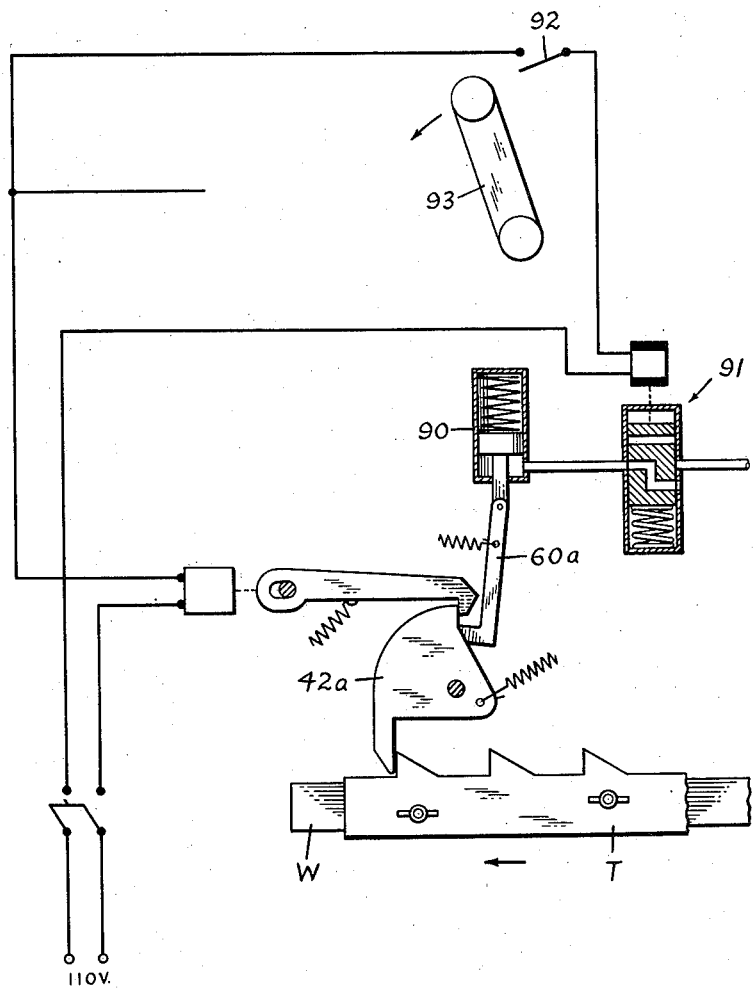
Figure 9 is a schematic showing of a modified control system for use with another type of power tool, for example, such as, a punch press.

When utilizing the system in conjunction with a punch press or other element having a rotating drive member instead of a reciprocating movement as in the drill described above, the controls may be modified somewhat. Thus, as shown in Figure 9, instead of mounting the release hook 60a on the reciprocating element, the release hook 60a may be actuated directly by means of a solenoid or, as illustrated by means of an air cylinder and piston 90 under the control of a solenoid controlled slide valve 91. The slide valve is moved between air supplying and air exhausting position by means of a switch 92 which is closed by rotation of a drive element 93 of a punch press or the like so that the slide valve 91 and the release hook 60a are reciprocated in timed relation to the operation of the apparatus thereby enabling the control member 42a to be actuated and advanced in a desired sequence of operations, as described above. It will be understood, that the rotary member 93 passes through one revolution for each engagement of each tooth with the control member 42. This operation is controlled by an electric circuit similar to that disclosed in Figures 4 to 7.

The system is susceptible to further modification, for example, by doing away completely with the release hook 60 or 60a and substituting therefor other trip means for releasing the hook member 50. As illustrated in Figure 10, the hook member 50a may be provided with a rearward extension 95 which is disposed in front of a plunger 96 in an air cylinder 97 which is controlled in turn by a solenoid actuated slide valve 98. A switch 99 mounted at the outer end of the air cylinder 17a controls the slide valve 98. A piston rod 86a which cooperates with the switch 99 has a member 99a thereon which closes selectively the switch contacts 99b, 99c or the switch contacts 99d, 99e. The switch contacts 99d, 99e correspond to the switch 77 of Figures 4 to 7 in their operation and are connected in the control circuit in the same relation. Switch contacts 99b and 99c are connected in the circuit in the line 100 connected to the solenoid 98a of the solenoid valve 98 and relay coil 101a and by the line 102 to the normally open contacts 101b and 101c of the relay 101. When the switch contacts 99b and 99c are closed by return movement of the motor and piston P, a circuit is closed through the contacts 101b, 101c, lines 102, 100, contacts 99b, 99c and the solenoid 98a to ground energizing the solenoid 98a thereby moving the valve 98 to the air supplying position and driving the plunger 96 down against the extension 95 and thereby releasing the hook 50a from the control member 42a. As the switch 53 opens, the relay coil 101 is deenergized thereby opening the circuit through coil 98a so that the slide valve moves to the exhaust position and the plunger 96 is retracted by the spring 97a to allow the hook member 50a to be restored to its initial or starting position.

If desired, the air cylinder 97 can be replaced by a solenoid trip having a solenoid coil corresponding to and connected in the circuit in the same way as the coil 98a.

It will be understood that the system just described is applicable to other devices than the drill shown and may be readily adapted to many different purposes, such as for example, the insertion of screws, rivets or the like into accurately spaced holes in a workpiece, or for punching, milling, cutting or other use in modifying the workpiece.

While preferred forms of the apparatus have been described herein, it will be understood that other types of mechanism for advancing the power tools or actuating them than those disclosed herein may be used and that mechanical, hydraulic or electric mechanisms may be used for advancing and retracting the drills, punches and other mechanisms. Moreover, the parts of the device such as the guide and gauges for controlling the movement and locating the workpiece with respect to the power tool may be modified depending upon requirements.

Therefore, the form of the invention described herein should be considered as illustrative and not as limiting the scope of the following claims.

I claim:

1. A power tool comprising a support, means on said support for guiding a workpiece on which operations are to be performed, a member on said support for mounting a tool, fluid-actuated power means on said support for advancing said member toward said workpiece, a valve for admitting fluid to said power means to advance said tool mounting member toward said workpiece and for discharging fluid from said power means, a templet moveable with said workpiece and having elements thereon corresponding to said operations, a control member on and movable relative to said support in the path of said elements, releasable means for limiting movement of said control member, said releasable means being movable in response to engagement of said control member by an element of said templet for actuating said valve to admit fluid to said power means to advance said tool mounting member toward said workpiece, means movable with said mounting member toward said workpiece to a predetermined position for actuating said valve to discharge fluid from said power means, means for retracting said tool mounting member, and means movable in response to movement of said tool mounting member away from said workpiece for releasing said releasable means from said control member to enable the element engaging said control member to move and pass by said control member without energizing said power means.

2. A drilling apparatus comprising a support, means on said support for guiding a workpiece on which operations are to be performed, a member on said support for mounting a tool for performing an operation on said workpiece, electrically controlled power means on said support for advancing said member toward and retracting it from said workpiece, a first switch operatively connected with and operable to actuate said power means to advance said member toward said workpiece, a templet movable with said workpiece and having elements thereon corresponding to said operations, a control member on and movable relative to said support in the path of said elements, releasable means for limiting movement of said control member and responsive to movement of said control member by an element of said templet for operating said first switch to actuate said power means and to advance said tool mounting member toward said workpiece, a second switch operatively connected with said power means to actuate means to retract said tool mounting member, means responsive to movement of said mounting member toward said workpiece to a predetermined position for actuating said second switch to retract said tool mounting member, means movable with said tool mounting member for releasing said releasable means from said control member to enable the element in engagement with said control member to move and pass by said control member without energizing said power means and means responsive to movement of said control member for reconnecting the releasable means to said control means.

3. An apparatus for performing a series of operations on a workpiece comprising power tool means, a guide for a workpiece disposed in front of said tool means, fluid-actuated power means for advancing said tool means toward said workpiece to perform an operation thereon, an electrically-actuated valve for admitting fluid to said power means for advancing said tool and discharging fluid from said power means, a templet to be secured to and movable with said workpiece, said templet having projections thereon corresponding in number and location to operations to be performed on said workpiece, a movable control member in the path of said templet and movable by engagement with said projections, a first switch electrically connected to said valve and operable to actuate means to actuate said valve to admit fluid to said power means, means releasably connected with and limiting movement of said control member and responsive to movement of said control member by a projection for operating said first switch to actuate means to advance said tool means, a second switch electrically connected to said valve and responsive to advancing movement of said tool means to a predetermined position to actuate means for actuating said valve to discharge fluid from said power means, and means movable with said tool means for releasing said means for actuating said first switch from said control member to enable said control member to move out of the path of a projection in engagement with said control member after an operation corresponding to said projection has been performed on said workpiece.

4. The apparatus set forth in claim 3 comprising means for connecting said control member to said means for operating said first switch after a projection has passed by said control member.

5. An apparatus for modifying a workpiece comprising a power tool, guide means adjacent to said power tool for supporting and guiding said workpiece past said power tool, a control member pivotally mounted adjacent to said guide means, a templet to be detachably secured to said workpiece and movable therewith on said guide means, said templet having elements thereon successively engageable with said control member to move it pivotally, fluid actuated means for advancing said power tool toward said workpiece to perform an operation on it, a control valve for admitting fluid to said fluid-actuated means to advance said power tool and discharging fluid therefrom, a first control element for actuating said valve, a movable restraining member releasably engaging said control member and limiting pivotal movement thereof, means responsive to movement of said restraining member for actuating said control valve to admit fluid to said fluid-actuated means in response to engagement of an element on said templet with said control member, a second control element connected to said valve and responsive to movement of said power tool to a predetermined position for actuating said control valve to discharge fluid from said fluid-actuated means, resilient means for retracting said power tool from said predetermined position, a release member responsive to movement of said power tool for releasing said restraining member from said control member as said power tool is being retracted to enable said control member to move and allow an element on said templet to pass by it, and means for again connecting said restraining means to said control member after said element has passed by said control member.

6. The apparatus set forth in claim 5 in which the restraining member comprises a hook engaging said control member and the release member is engageable with said hook to disengage it from said control member.

References Cited in the file of this patent
UNITED STATES PATENTS

| | | |
|---|---|---|
| 395,592 | Schwarzler | Jan. 1, 1889 |
| 447,562 | Dawes | Mar. 3, 1891 |
| 2,300,253 | Hamilton et al. | Oct. 27, 1942 |